United States Patent
Locoge et al.

(10) Patent No.: US 9,476,697 B2
(45) Date of Patent: Oct. 25, 2016

(54) METHOD FOR DETERMINING A CLOSED TRAJECTORY BY MEANS OF A LASER AND A LASER LIGHT SENSOR AND APPARATUS FOR DETERMINING A CLOSED TRAJECTORY

(71) Applicant: Pruftechnik Dieter Busch AG, Ismaning (DE)

(72) Inventors: Pascal Locoge, Ismaning (DE); Christine Zocke, Riemerling (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 0 days.

(21) Appl. No.: 14/722,711

(22) Filed: May 27, 2015

(65) Prior Publication Data
US 2015/0345935 A1    Dec. 3, 2015

(30) Foreign Application Priority Data

May 28, 2014 (DE) .......................... 10 2014 210 244

(51) Int. Cl.
| | | |
|---|---|---|
| *G01B 11/22* | (2006.01) | |
| *G01B 11/12* | (2006.01) | |
| *G01B 11/26* | (2006.01) | |
| *G01B 11/27* | (2006.01) | |

(52) U.S. Cl.
CPC .............. *G01B 11/12* (2013.01); *G01B 11/26* (2013.01); *G01B 11/272* (2013.01)

(58) Field of Classification Search
CPC .. G01C 21/00; G01C 15/006; G01C 15/008; G01C 3/00; G01C 9/06; G01B 11/12; G01B 11/002; G01B 11/14; G01B 11/24; G01B 11/2433; G01B 11/26; G01B 11/272; G01N 2035/0406; G01N 2035/0494
See application file for complete search history.

(56) References Cited

U.S. PATENT DOCUMENTS

| | | | | |
|---|---|---|---|---|
| 4,968,147 | A * | 11/1990 | Shoemaker | G01B 11/27 33/293 |
| 5,717,491 | A | 2/1998 | Busch et al. | |
| 2005/0237516 | A1* | 10/2005 | Lysen | G01B 11/272 356/153 |
| 2006/0196060 | A1* | 9/2006 | Suing | G01B 11/272 33/286 |
| 2014/0327762 | A1* | 11/2014 | Holzl | G01B 11/14 348/135 |

FOREIGN PATENT DOCUMENTS

| | | |
|---|---|---|
| DE | 3911307 A1 | 10/1990 |
| DE | 19506471 A1 | 8/1996 |
| DE | 19949834 A1 | 4/2001 |
| DE | 10109462 A1 | 9/2002 |
| DE | 10138831 A1 | 2/2003 |
| DE | 10142462 A1 | 3/2003 |
| DE | 10236555 A1 | 2/2004 |
| DE | 10352719 A1 | 6/2005 |
| DE | 102004020406 A1 | 11/2005 |
| DE | 102004024398 A1 | 12/2005 |
| DE | 102006012633 A1 | 9/2006 |
| DE | 112004000113 T5 | 10/2013 |
| DE | 102012022487 A1 | 5/2014 |
| DE | 112014000113 | 1/2015 |
| EP | 0543971 A1 | 6/1993 |

* cited by examiner

*Primary Examiner* — Michael P Stafira
(74) *Attorney, Agent, or Firm* — Barlow, Josephs & Holmes, Ltd.

(57) ABSTRACT

The invention relates to a method for determining a closed trajectory curve (10) by laser (12) and a laser light sensor (14) having a flat field of view (16), wherein the method comprises the steps A to E. The invention further relates to an apparatus for determining a closed trajectory curve (10).

10 Claims, 2 Drawing Sheets

METHOD FOR DETERMINING A CLOSED TRAJECTORY BY MEANS OF A LASER AND A LASER LIGHT SENSOR AND APPARATUS FOR DETERMINING A CLOSED TRAJECTORY

BACKGROUND OF THE INVENTION

The present invention relates to a method for determining a closed trajectory by means of a laser and a laser light sensor as well as an apparatus for determining a closed trajectory.

Methods and apparatuses of the kind mentioned in the introduction are used, in particular, for methods of measurement that are intended to determine the position of a rectilinear reference direction or reference axis relative to the position of the center axis or axis of symmetry of a circular cylindrical bore or opening of a body or of an apparatus in order to bring this bore or opening into alignment with another bore, for example, the center axis of which then represents the reference axis. For this, the laser is aligned such that the laser light beam of the laser can be aligned coincidentally with the reference axis. Furthermore, the laser light sensor is arranged in a defined position in the bore and a flat field of view of the laser light sensor is arranged perpendicularly to the center axis of the bore and the origin of the coordinate system of the field of view is arranged, at least approximatively, in the center of the bore. While this arrangement of the field of view is maintained, the field of view is brought or rotated into various mutually inclined angular positions, with the field of view being irradiated by the laser light beam in each angular position. When a misalignment is then present, that is, when the reference axis is not aligned with the center axis, the coordinates of the laser light spot of the laser light beam recorded in any angular position of the field of view generally describe a closed curved trajectory curve in the form of an ellipse or a circle, insofar as an angular range of 360 degrees is covered in total by the adjusted angular positions. The center of the circle or the ellipse then lies on the center axis and, on the basis of the creation of the circle or ellipse, it is then possible to determine the alignment of a reference axis relative to a center axis of a cylindrical bore.

The measurement of the angular position or the inclination angle of the fields of view generally resorts to an angle measurement instrument, such as an inclinometer, which enables the measurement of an inclination relative to the direction of gravitational force. The measurement of the angular position serves for determination of the angular position of the respective trajectory curve described by the laser light point and functions with high accuracy when the bores of turbines, for example, are to be aligned, which are essentially horizontally aligned. For the determination of the alignment of essentially vertically aligned bores or openings, it is not possible—owing to the principle of measurement—to use an inclinometer or else not possible to use it with sufficient accuracy. This is correspondingly also the case for unstable floors, that is, when the bore is situated on a ship, for example.

Methods and apparatuses that operate with laser light sensors having flat fields of view and/or having angle measurement instruments or inclinometers are generally known, for example, from DE 195 06 471 A1, DE 102 36 555 A1, DE 101 42 462 A1, DE 101 38 831 A1, DE 39 11 307 A1, DE 199 49 834 A1, DE 10 2004 024 398 A1, and DE 11 2004 000 113 T5.

SUMMARY OF THE INVENTION

The problem of the invention is to present a method and an apparatus that enable the determination of the alignment of a reference axis relative to a center axis of a circular cylindrical bore with high accuracy even in situations in which a measurement of the inclination angle is not possible or is not possible with sufficient accuracy.

This problem is solved by a method of the present invention.

The field of view of the method and of the apparatus has a coordinate system with an X coordinate axis and a Y coordinate axis at a right angle to the X coordinate axis, with the laser light sensor being set up so as to record on the field of view the X coordinate and Y coordinate of the position of the laser light spot of the impinging laser light beam of the laser on the field of view or with the laser light sensor being set up so as to record the X coordinate and Y coordinate of the position of the laser light spot that is formed on the field of view during irradiation with the laser light beam.

The method comprises the following steps:

(A) Arrangement of the field of view in a circular cylindrical bore or in a circular cylindrical opening of a body and conveying of the field of view into a first position;

(B) Irradiation of the field of view with a laser light beam generated by the laser and recording of the X coordinate and Y coordinate of the position of the laser light spot of the laser light beam that the laser light spot assumes in the field of view.

(C) Conveying of the field of view in temporal succession into at least two further positions, irradiation of the field of view with the laser light beam in each of the further positions, and recording of the X coordinate and Y coordinate of the position of the laser light spot of the laser light beam that the laser light spot assumes on the field of view in each of the further positions, wherein, in the first position and also in each of the further positions, the X coordinate axis and the Y coordinate axis are oriented at a right angle to the center axis of the bore and the origin of the coordinate system exhibits a predetermined distance from the inner surface of the bore in the direction of the X coordinate axis or Y coordinate axis, wherein further positions differ in terms of the magnitude of the positional angle at which the Y coordinate axis or the X coordinate axis is inclined in a predetermined direction of rotation with respect to the Y coordinate axis or the X coordinate axis of the field of view in the first position, and wherein the field of view in step C is conveyed in temporal succession into the two further positions in such a way that the positional angle of each of the further positions is greater than the positional angle of each temporally previously assumed further position, with, in the temporally last assumed position, the magnitude of the positional angle being at least 90 degrees;

(D) Assignment of zero degrees to the angle value of the X coordinate and Y coordinate recorded in the first position of the field of view (16);

(E) Determination of the closed trajectory curve (10) by means of the X coordinate recorded in step (B) and (C) and/or the Y coordinate recorded in step (B) and (C), wherein, in step (E), furthermore, a plot of the trajectory curve (10) is determined on the basis of the recorded X coordinates and/or the recorded Y coordinates, said plot being parameterized by the positional angle of the field of view (16), which is measured starting from an angle value of zero degrees in the direction of the predetermined direction of rotation or is measured starting from the positional angle with an angle value of zero degrees in the direction of the predetermined direction of rotation or starting from the direction or spatial direction defined by the positional angle or angle with an angle value of zero in the direction of the predetermined direction of rotation.

The steps A to C serve, in a way that is known as such, for recording the positions of the laser light spot in the different positions, comprising the first position and the at least two further positions. As a result of the fact that the origin of the coordinate system exhibits a predetermined distance from the inner surface of the bore in the direction of the X coordinate axis or Y coordinate axis or a predetermined distance from the inner surface or inner wall of the circular cylindrical bore that is measured in the direction of the X coordinate axis or Y coordinate axis, it is possible to ensure that the origin of the coordinate system has a defined position in each of the mutually inclined positions.

If the predetermined distance corresponds to the radius of the circular cylindrical bore or essentially corresponds to it, the origin of the coordinate system in each of the mutually inclined positions is situated in the center or approximatively in the center of the bore, as a result of which the error influence of a displacement of the center, in particular during switching or conveying from one position to another position, can be reduced advantageously. On account of what is discussed above, the predetermined distance from the inner surface of the bore in the direction of the X coordinate axis or Y coordinate axis corresponds especially preferably to the radius of a circular cylindrical bore.

In step B, there occurs the irradiation of the field of view with the laser light beam generated by the laser and the recording of the X coordinate and Y coordination of the position of the laser light spot of the laser light beam that the laser light spot assumes on the field of view. The laser light beam, which can be aligned coincidentally with the reference axis, is a spatially fixed laser light beam, the laser light spot of which, when the laser light beam, spaced apart from the center axis of the bore, impinges on the field of view, defines an ellipse or a circle on the field of view when it is conveyed into several mutually inclined positions. The irradiation of the field of view with the laser light beam insofar occurs in such a way that the laser light beam impinges on the field of view at a spacing from the center axis.

In step C, the field of view is conveyed in temporal succession into the at least two further positions in such a way that the positional angle of each of the further positions is greater than the positional angle of each temporally previously assumed position or further position. Or, in other words, the magnitude of the positional angle increases from position to position for temporally successive conveyance according to step C.

For the determination of the angular position of a closed trajectory curve in the form of an elliptical trajectory or a circular trajectory or for the determination of a plot of the elliptical trajectory or circular trajectory on the basis of the recorded X coordinates and Y coordinates of the laser light spot on a field of view, which is parameterized by an inclination angle of the field of view, the inclination angle of the field of view is measured, in known methods, relative to the direction of gravitational force by means of a rotation angle measurement instrument or gauge, such as, for example, an inclinometer, which entails the drawback that the measurement of the angle of rotation—owing to the measuring principle of the inclinometer or of any inclination measurement device—is not possible or is not possible with sufficient accuracy for determining the alignment of a reference axis relative to a center axis of a circular cylindrical bore of a body or of a device, such as, for example, a turbine or a motor. This is correspondingly also the case for unstable floors, that is, when the bores to be aligned are situated on a ship, for example.

In contrast to the above known solutions, the method according to the invention enables the determination of the alignment of a reference axis relative to a center axis of a cylindrical bore or opening of a body or of a device with high accuracy even in situations in which a measurement of the inclination angle is not possible or is not possible with sufficient accuracy. This is because, in step E of the method according to the invention, a plot of the ellipse trajectory is determined on the basis of the X coordinates and/or Y coordinates recorded in step B and C, said ellipse trajectory being parameterized by the positional angle of the field of view, which, starting from an angle value of zero degrees (compare step D), is measured in the direction of the predetermined direction of rotation. This means that, in an advantageous manner, a measurement of the inclination angle or positional angle need not be performed when the X coordinates and Y coordinates of the positions of the laser light spot on the flat field of view are recorded. This is because the angular position or the parameter plot of the closed trajectory curve or the curved closed trajectory curve, which is preferably an ellipse or a circle, can be determined advantageously by using the coordinates recorded in step B and step C, the angle value in a magnitude of zero degrees, and the assignment of this angle value to the X coordinate and Y coordinate (compare step D) and by using the predetermined direction of rotation. Here, the direction of rotation can be predetermined, in particular by a user, who, for implementation of the temporally successive conveyance, can manually offset or skew the field of view, for example. In particular, no measurement is also required to measure the magnitude or the angle value of the temporally last assumed position, which is at least 90 degrees. For this, in accordance with the invention, the positions are chosen advantageously in such a way that the temporally last assumed position affords an angle of at least 90 degrees. This can occur in a simple and practical way by simply making a crude estimate beforehand. The determination of the precise angular position or the determination of the precise trajectory curve parameterized by the positional angle occurs, by contrast, in step E.

The conveying of the field of view from one position to another position in step C can occur in any conceivable way. In particular, for this, the field of view can, for example, be attached to a holding device in a movable manner in such a way that the field of view can be conveyed into the first and further position, whereby, for locking the field of view in a predetermined position, it is possible to provide, for example, suitable locking means for locking the field of view on the holding device.

The laser light sensor can be any laser light sensor furnished with a flat field of view. Especially preferably, it is a laser light sensor that has a plurality of line sensors—for example, like the line sensors utilized in digital photography cameras—for creation of the field of view. The X coordinates and Y coordinates recorded by the laser light sensor can be fed in the form of analog or digital signals via a signal transmission path—also wirelessly—to an analysis device, for example, such as a computer, for example, in the form of a laptop or a tablet, for example, for further analysis.

That two axes—such as, for example, the center axis of the bore and the X coordinate axis or the center axis of the bore and the Y coordinate axis—have a right-angled orientation or alignment with respect to each other obviously does not presume that these axes must always intersect. When the two axes do not intersect, they form a common point of intersection by a translational displacement and can then enclose a right angle or essentially right angle.

When, in conjunction with the magnitude of the positional angle, it is stated that the Y coordinate axis or the X coordinate axis is inclined in a predetermined direction of rotation with respect to the Y coordinate axis or the X coordinate axis of the field of view in the first position by a positional angle with a predetermined direction of rotation, this does not necessarily mean that, for example, the X coordinate axis in the first position forms a point of intersection with the X coordinate axis in the second position. The term inclination instead encompasses the fact that, when no common point of intersection is formed, the X coordinate axis of the first position or of the further position can form a common point of intersection or be caused to intersect by at least one translational displacement of the field of view.

The closed curved trajectory curve that is determined advantageously without any inclinometer measurement by the method according to the invention can then be used advantageously in the way known in the art, for example, for the determination of the alignment or position of a reference axis relative to a center axis of a circular cylindrical bore of a body or of an apparatus, so that, by means of the method according to the invention, the advantageous determination of the alignment or position of a reference axis relative to a center axis of a circular cylindrical bore of a body or of an apparatus is made possible or can be realized with high accuracy even in situations in which a measurement of the positional angle is not possible or is not possible with sufficient accuracy.

In the method according to the invention, it is provided in step C that the field of view is conveyed into at least two further positions in temporal succession. Especially advantageously, however, the field of view can be conveyed into a substantially larger number of positions, as a result of which the determination of the closed trajectory curve can be based on a large number of positions, this entailing a very precise accuracy in recording or determining the trajectory curve, which can be determined in a known way, for example, by curve fitting to the recorded X coordinates and Y coordinates. Thus, this large number of positions can preferably be at least ten or twenty or more than ten or twenty.

The X coordinates and Y coordinates, mentioned above and below, of the position of the laser light spot of the laser light beam impinging on the field of view or of the laser light spot formed on the field of view during irradiation with the laser light beam are the coordinates of a position in the form of a point, although the laser spot always has an area extension on the field of view.

The X coordinates and Y coordinates of the position of the laser light spot refer above and below always to the coordinates of a point, which can be determined from derivation of the area and/or the brightness distribution of the laser light spot on the area. In particular, the point can be, for example, the center of gravity of the area of the laser light spot. The determination or calculation of the point can preferably be performed in an automated manner by means of a computational apparatus, such as, for example, a computer, on the basis of the digital and/or analog signals that are assigned to the laser light spot and are emitted by the laser light sensor.

In an especially preferred embodiment of the method according to the invention, the field of view in step C is conveyed into at least fifteen further positions, with the magnitude of the positional angle being 360 degrees in the temporally last assumed position, and, in step E, a closed trajectory curve, which is parameterized by the positional angle of the field of view, is determined in the form of an ellipse or a circle, wherein exclusively only the recorded Y coordinates or exclusively only the recorded X coordinates are used for determination of the parameterized trajectory curve. In this especially preferred embodiment, viewed overall, a positional change in the manner of a rotation by 360 degrees is covered. This desired positional angle of the temporally last assumed position can also be adjusted or effected in a simple and practical way without any inclinometer measurement.

The above, especially preferred embodiment is particularly advantageous in the case when, owing to measurement inaccuracies, the recorded X coordinates or the recorded Y coordinates exhibit great variation, in particular in regard to a trajectory curve in the form of a circle or an ellipse that is determined by curve fitting to the recorded X coordinates and Y coordinates. It could also be shown by test series that, in spite of the existence of great variations in the X coordinates or the Y coordinates, a closed trajectory curve determined by means of this preferred embodiment would come very close to or advantageously depart only very slightly from the trajectory curve that the laser light spot would describe on the flat field of view without the measurement inaccuracies. (If appropriate, please supplement or note what could be the causes of the measurement inaccuracies when Centraligh/Boralign is used.)

For determination of this variation in the X coordinates or the Y coordinates, it is possible, for example, to determine for each recorded position of the laser light spot, in a known way, the distance of the position from the ellipse or the circle in the direction parallel to the X coordinate axis and/or the direction parallel to the Y coordinate axis—that is, the distance measured in a direction parallel to the X coordinate axis or Y coordinate axis—and to form a mean value of these distances.

If the quantified variation of the X coordinates or Y coordinates is then too great or exceeds a predetermined magnitude, it is possible according to the above-described embodiment, by exclusively using the Y coordinates, when the X coordinates vary too strongly, or by exclusively using the X coordinates, when the Y coordinates vary too strongly, to create a closed curved trajectory curve, in the form of an ellipse or a circle, that comes very close to the trajectory curve that the laser light spot would describe on the flat field of view without the measurement inaccuracies and therefore can be employed advantageously for determining the alignment of a reference axis relative to a center axis of a cylindrical bore of a body or of an apparatus.

In the above, especially preferred embodiment a conveying into substantially more than fifteen positions can also be provided for in step C. Thus, a larger number of preferably at least twenty or thirty more than ten or thirty positions can be advantageously provided for, this entailing an increase in the accuracy of the closed trajectory curve, as already explained above.

Preferably, the determination of a parameterized trajectory curve in the form of an ellipse or a circle occurs exclusively on the basis of the recorded Y coordinates or exclusively on the basis of the recorded X coordinates by means of a function that is based on an ellipse equation, among other things, as is presented below by way of example for the case in which exclusively only the recorded Y coordinates are employed.

Thus, the recorded Y coordinates can be initially scaled and normalized according to the following relation:

$$Y_{normalized} = \frac{y - \left(\frac{ymax + ymin}{2}\right)}{\left(\frac{ymax - ymin}{2}\right)}$$

Furthermore, by using the equation for a centered and rotated ellipse $$Y_{max} = a \cos t \sin \theta_0 + b \sin t \cos \theta_0$$

and on the basis of the above normalization, the following relation can be derived:

$$Y_{max} = \sqrt{a^2(\sin\theta_0)^2 + b^2(\cos\theta_0)^2}$$

The centered or scaled and normalized measured values can then be expressed in the form of the following sine function:

$$\frac{y}{y_{max}} = \frac{y}{\sqrt{a^2(\sin\theta_0)^2 + b^2(\cos\theta_0)^2}} = \sin(\varphi_0 + t).$$

Accordingly, by means of the relation $$\varphi = \sin^{-1}\left(\frac{y - \left(\frac{ymax + ymin}{2}\right)}{\left(\frac{ymax - ymin}{2}\right)}\right)$$

a positional angle φ of field of view can be assigned to each recorded Y coordinate of the laser light spot on the flat field of view, so that the points or positions that are created in this way describe a closed curved trajectory curve in the form of an ellipse (or a circle, because the circle is a special case of an ellipse), which is parameterized by an angle φ, wherein, in the last relation, a scaling between 0 degrees and 360 degrees is to be performed, because the arcsine function is defined only in the range of values [−90 degrees, 90 degrees].

In another preferred embodiment of the method according to the invention, the field of view in step C is conveyed into at least two further positions, whereby, in the temporally last assumed position, the magnitude of the positional angle is at least 90 degrees and less than 360 degrees or essentially 180 degrees, wherein, in step E, a closed trajectory curve 10 in the form of an ellipse or a circle is determined by curve fitting to the recorded X coordinates and Y coordinates, and wherein, for determination of the parameterized plot of the trajectory curve, the positional angle measured starting from the angle value of zero degrees or the angle value in the magnitude of zero degrees in the direction of the predetermined direction of rotation is assigned to each point on the trajectory curve. In this further preferred embodiment, it is also possible in step C to provide for conveying into more than two positions. Thus, it is possible advantageously to provide for a larger number of preferably at least ten or twenty or more than ten or twenty positions, this entailing the increase in accuracy of the closed trajectory curve.

The above further preferred embodiment is of advantage, in particular, when, owing to existing spatial circumstances, a realization of 360 degrees or a rotation of 360 degrees is not possible; this embodiment is also used for determining the parameterized trajectory curve only when the recorded X coordinates or the recorded Y coordinates do not exhibit too great a variation due to measurement inaccuracies, in particular in regard to a trajectory curve in the form of a circle or an ellipse determined by curve fitting to the recorded X coordinates and Y coordinates—in regard to the variations, compare to this also the above statements.

In particular, it could be shown by test series that, in spite of the existence of variations in the X coordinate or in the Y coordinate, a closed trajectory curve in the form of a circle or an ellipse is determined or can be determined by means of the further preferred embodiment, said closed trajectory curve coming very close to or advantageously deviating only very slightly from the trajectory curve that the laser light spot would describe on the flat field of view without measurement inaccuracies, so that the determined closed trajectory curve can then be employed advantageously in a known way for determining the alignment of a reference axis relative to a center axis of a cylindrical bore of a body or of an apparatus.

Especially preferably, the steps D to F are performed in an automated manner, so that the method according to the invention can be integrated advantageously in a running production process, for example, in which a routine monitoring of the alignment of a reference axis relative to a center axis of a cylindrical bore of a body or of an apparatus is desired or required.

Identification of the steps by means of the letters A to E is not to be understood as binding them to a temporal sequence. Thus, the steps A, B, C, and E are traversed in succession, whereas step D can already be carried out after step B. In particular, however, all steps can be carried out in succession, that is, step B after step A, step C after step B, step D after step C, and step E after step D.

The apparatus according to the invention for determining a closed trajectory curve comprises a laser, a laser sensor having a flat field of view, a holding device, and an analysis unit.

The field of view has a coordinate system with an X coordinate axis and a Y coordinate axis at a right angle to the X coordinate axis. The laser light sensor is set up so as to record the X coordinate and Y coordinate of the position of the laser light spot of the laser light beam that can be produced by the laser and impinges on the field of view.

The field of view is attached to the holding device in a movable manner in such a way that the field of view can be conveyed into a first position and into further positions on the holding device, in which the X coordinate axis and the Y coordinate axis are oriented at a right angle with respect to the center axis of a circular cylindrical bore and in which the origin of the coordinate system exhibits a predetermined distance from the inner surface of the bore in the direction of the X coordinate axis or Y coordinate axis, with further positions differing in the magnitude of the positional angle by which the Y coordinate axis or the X coordinate axis is inclined in a predetermined direction of rotation with respect to the Y coordinate axis or the X coordinate axis of the field of view in the first position.

The analysis unit is set up so as to assign an angle value of zero degrees to the X coordinate and Y coordinate recorded in the first position of the field of view and to determine the closed trajectory curve from the X coordinates and/or Y coordinates recorded in the first position and in the further positions.

The analysis unit is further set up so as to determine a plot of the trajectory curve on the basis of the recorded X coordinates and/or Y coordinates, said trajectory curve being parameterized by the positional angle of the field of view that is measured starting from the predetermined angle value of zero degrees or the angle value in the magnitude of zero degrees in the direction of the predetermined direction of rotation.

The apparatus according to the invention is characterized in particular in that the analysis unit is set up so as to determined a plot of the trajectory curve on the basis of the recorded X coordinates and/or Y coordinates, said trajectory curve being parameterized by the positional angle of the field of view that is measured starting from the angle value of zero degrees or the angle value in the magnitude of zero degrees in the direction of the predetermined direction of rotation.

Therefore, in analogy to the reasons already presented above in conjunction with the method according to the method, the determination of the alignment of a reference axis relative to a center axis of a circular cylindrical bore of a body is made possible by means of the apparatus according to the invention with high accuracy even in situations in which a measurement of the positional angle of the field of view is not possible or is not possible with sufficient accuracy.

In a preferred embodiment, the closed trajectory curve is an ellipse or a circle and the analysis unit is set up, for determination of the trajectory curve parameterized by the positional angle, so as to use exclusively only the Y coordinates or exclusively only the X coordinates when the field of view is conveyed into at least fifteen positions and when, in the temporally last assumed position, the magnitude of the positional angle is 360 degrees, this entailing the advantages already presented above in conjunction with the method according to the invention. The determined closed curved trajectory curve can then be employed advantageously in known way for determining the alignment of a reference axis relative to a center axis of a cylindrical bore of a body or of an apparatus.

In another preferred embodiment, the analysis unit is set up so as to determine a closed trajectory curve in the form of an ellipse or a circle by curve fitting to the X coordinates and Y coordinates and, for determination of the parameterized plot of the trajectory curve, so as to assign the positional angle to be measured starting from the angle value of zero degrees in the direction of the predetermined direction of rotation to each point on the trajectory curve, when the field of view is conveyed into at least two further positions and, in the temporally last assumed position, the magnitude of the positional angle is at least 90 degrees and less than 360 degrees or essentially 180 degrees, this entailing the advantages already presented above in conjunction with the method according to the invention.

BRIEF DESCRIPTION OF THE DRAWINGS

Exemplary embodiments of the invention will be explained in detail below on the basis of the attached drawing: Shown in the drawing are.

DESCRIPTION OF THE INVENTION

Figure 1A:
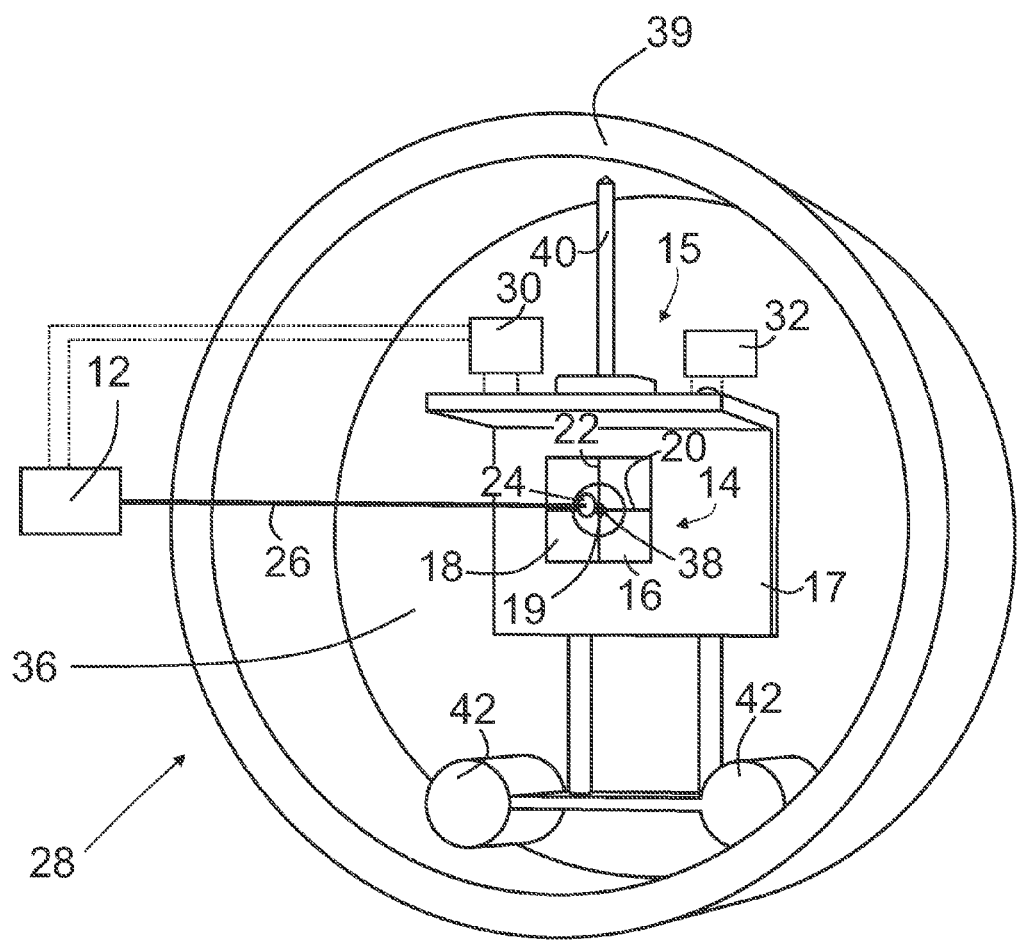
FIG. 1A a schematic illustration of an exemplary embodiment of an apparatus for determining a closed trajectory curve.

The apparatus 28 for determining a closed trajectory curve comprises a laser 12, a laser light sensor 14 having a flat field of view 16, a holding device 17, and an analysis unit 32.

The field of view 16 has a coordinate system 18 with an X coordinate axis 20 and a Y coordinate axis 22 that is at a right angle to the X coordinate axis 20.

The laser light sensor 14 is set up so as to record the X coordinate and Y coordinate of the position of the laser light spot 24 on the field of view 16 of the laser light beam 26 that can be generated by the laser 12 and impinges on the field of view 16.

The field of view 16 is attached to the holding device 17 in a movable manner in such a way that the field of view 16 can be conveyed into a first position and into further positions on the holding device 17, in which the X coordinate axis 20 and the Y coordinate axis 22 are oriented at a right angle to the center axis 38 (symbolized in FIG. 1A only very schematically by a black point) of a circular cylindrical bore 36 and in which the origin 51 of the coordinate system 18 exhibits a predetermined distance from the inner surface 46 of the bore 36 in the direction of the X coordinate axis or Y coordinate axis, said distance corresponding to the radius of the circular cylindrical bore 36.

The further positions differ by the magnitude of the positional angle $\phi_r$ (compare FIG. 1B) by which the coordinate axis 22 in a predetermined direction of rotation 44 is inclined with respect to the Y coordinate axis of the field of view in the first position. The further positions are identified schematically in FIG. 1B by dashed fields of view 16; the first position is symbolized by the field of view 16 with the solid line.

In order to implement the conveying of the field of view 16 into the first position and into the further positions, the field of view 16 is attached in a fixed manner to a holding element 52 of the holding device 17, with the holding element 52 being able to rotate around an axis of rotation 19 (symbolized only very schematically in FIG. 1A by a black point—compare also FIG. 1B), which passes through the field of view 16, so that the field of view 16 can also rotate around this axis of rotation 19. Furthermore, a spacer 40 or feeler 40 is provided on the holding element 52 and the holding element 52 can be displaced longitudinally still further in the direction of the Y coordinate axis 22, so that the spacer 40 can create in any position or in any rotational position of the field of view 16 or of the holding element 52 around the axis of rotation 19, via the tip 53, a contact with the inner surface 46 of the bore 36. Finally, the holding element 52 can be displaced on a frame 48 of the holding device 17, which comprises two rods 50, in the longitudinal direction of the rods 50.

Owing to the above-described movement possibilities of the holding element 52, the field of view 16 can be conveyed by rotational and/or translational movements of the holding element 52 into individual positions (compare also FIG. 1B), with the spacer 40 ensuring in any position, by contact with the inner surface 46, that the origin 51 of the coordinate system 18 essentially exhibits or maintains the predetermined distance, which corresponds to the radius of the circular cylindrical bore 36, from the inner surface 46 of the bore 36 in the direction of the Y coordinate axis.

The analysis unit 32 is set up so as to assign an angle value of zero degrees to the X coordinate and Y coordinate recorded in the first position of the field of view 16 during or after appropriate irradiation with the laser light beam 26 and to determine a closed trajectory curve from the X coordinates and/or Y coordinates recorded in the first position and in the further positions.

Furthermore, the analysis unit 32 is set up so as to determine a plot of the trajectory curve 10 (compare FIG. 2), which is parameterized by the positional angle $\phi_r$ of the field of view 16, which is measured starting from an angle value of zero degrees in the direction of the predetermined direction of rotation 44, on the basis of the recorded X coordinates and/or the recorded Y coordinates.

In the following, an exemplary embodiment of the method according to the invention will be explained on the basis of FIG. 1A.

Figure 1B:
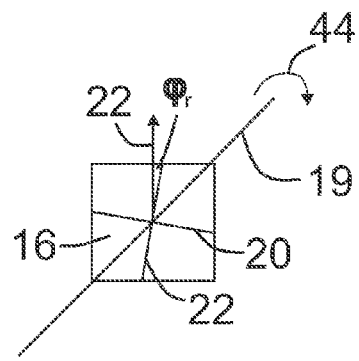
FIG. 1B a schematic front view onto the field of view according to FIG. 1A.
Figure 2:
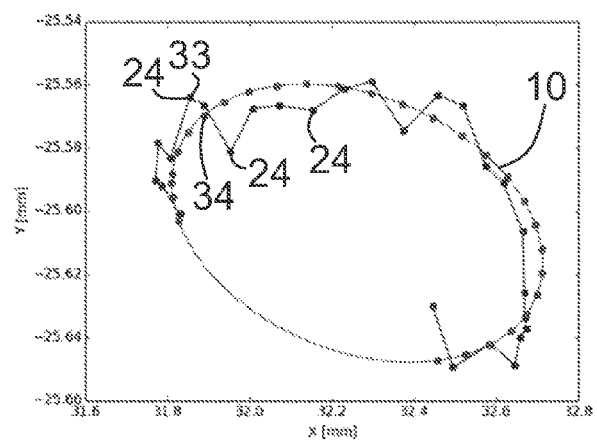
FIG. 2 a schematic illustration of laser light spots of a laser that are formed on a field of view together with an ellipse curve.

The method to be explained for determining a closed trajectory curve 10 (compare FIG. 2) by means of the laser 12 and the laser light sensor 14 comprises the following steps A to C:

(A) Arrangement of the field of view 16 in a circular cylindrical bore 36 of a body 39 and conveying of the field of view 16 into a first position (compare also FIG. 1B);

(B) Irradiation of the field of view 16 with a spatially fixed laser light beam 26 generated by the laser 12 and recording of the X coordinate and Y coordinate of the position of the laser light spot 24 of the laser light beam 26 that the laser light spot 24 assumes on the field of view 16; and (C) Conveying of the field of view 16 in temporal succession into at least thirty further positions, irradiation of the field of view 16 with the laser light beam 26 in each of the further positions and recording of the X coordinate and Y coordinate of the positions of the laser light spot 24 of the laser light beam 26 that the laser light spot 24 assumes on the field of view 16 in each of the further positions (compare also FIG. 2).

In the first position and also in each of the further positions, the X coordinate axis 20 and the Y coordinate axis 22 are oriented at a right angle to the center axis 38 of the bore and the origin 51 of the coordinate system 18 exhibits, in the first position and also in each of the further positions, the predetermined distance from the inner surface 46 of the bore 36 in the direction of the Y coordinate axis 22.

In order to implement the right-angled alignment of the X coordinate axis 20 and Y coordinate axis 22 with respect to the center axis 38, the frame 48 further has two feet 42 of circular cylindrical shape.

The further layers differ in the magnitude of the positional angle $\phi_r$ by which the Y coordinate axis 22 in the predetermined direction of rotation 44 is inclined with respect to the Y coordinate axis 22 of the field of view 16 in the first position, with the field of view 16 being conveyed in step C in temporal succession into the further positions in such a way that the positional angle of each of the further positions is greater than the positional angle of each temporally previously assumed position or further positions and with the magnitude of the positional angle being about 245 degrees in the temporally last assumed position.

The method according to the invention further comprises the following steps D and E:

(D) Assignment of zero degrees to the value of the angle of the X coordinate and Y coordinate recorded in the first position of the field of view 16; and (E) Determination of the closed trajectory curve 10 (compare FIGS. 2 and 3) by means of the X coordinate recorded in step (B) and (C) and the Y coordinate recorded in step (B) and (C) wherein, furthermore, a plot of the trajectory curve 10 is determined on the basis of the recorded X coordinate and the recorded Y coordinate, said plot being parameterized by the positional angle $\phi r$ of the field of view 16, which is measured starting from an angle value $\phi_{r0}$ (compare FIG. 1B) in the magnitude of zero degrees (compare step D) in the direction of the predetermined direction of rotation or is measured starting from the positional angle $\phi_{r0}$ with an angle value of zero degrees in the direction of the predetermined direction of rotation or starting from the direction or spatial direction defined by the positional angle $\phi_{r0}$ with an angle value of zero in the direction of the predetermined direction of rotation.

In step E, a closed trajectory curve 10 in the form of an ellipse is determined by curve fitting to the recorded X coordinates and Y coordinates. For determination of the parameterized plot of the trajectory curve 10 (compare FIG. 3), the positional angle $\phi_r$ measured starting from the angle value $\phi_{r0}$ in a magnitude of zero degrees in the direction of the predetermined direction of rotation 44 is assigned to each point on the trajectory curve 10 (compare FIG. 2). The analysis unit 32 is correspondingly set up and designed for this.

The assignment occurs as described below:

The angle value $\phi_{r0}$ in a magnitude of zero degrees is assigned to the position 33 of the laser light spot 24 on the field of view 16 that is defined or predetermined by the temporally first recorded X coordinate and by the temporally first recorded Y coordinate (compare FIG. 2). Furthermore, this position is assigned to the point 34, which exhibits the smallest distance from the elliptical trajectory, on the elliptical trajectory determined by curve fitting. The other positions of the laser light spot 24 are respectively assigned to the point that exhibits the smallest distance from the elliptical trajectory on the elliptical trajectory determined by curve fitting.

Figure 3:
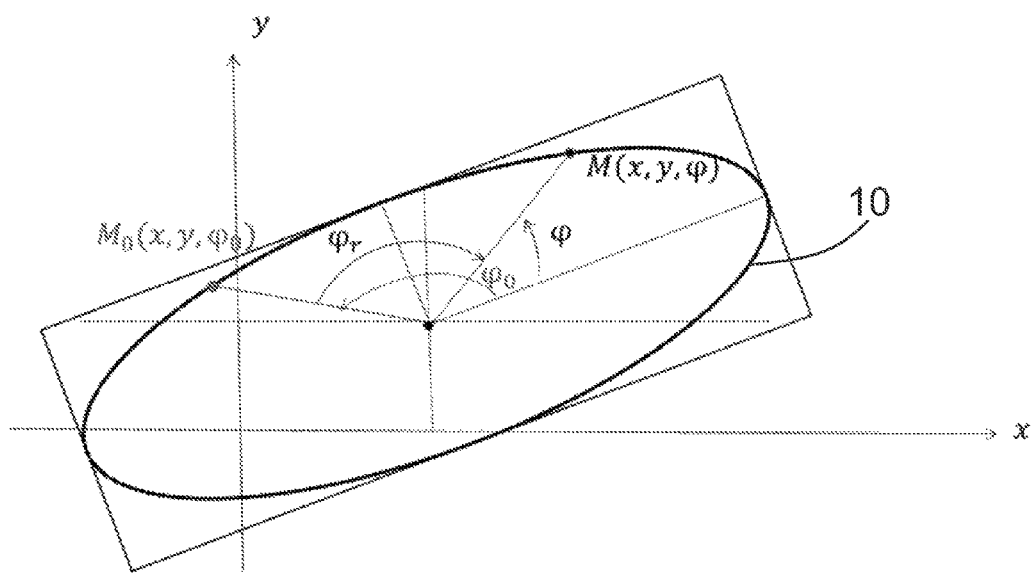
FIG. 3 a schematic illustration of a closed trajectory curve, parameterized by a positional angle, in the form of an ellipse.

FIG. 3 illustrates further how, by way of example, a point M (not the point 34 in FIG. 3, but rather the point M) is assigned to each recorded position of the laser light spot 24 on the ellipse, the angular position of which has not been initially adjusted to the predetermined angle value $\phi_{r0}$ in the magnitude of zero degrees. For adjustment, the value $\phi 0$ is to be subtracted from the angle value $\phi$ of the point M in order to determine the angle $\phi_r$ that is measured from the angle value $\phi_{r0}$ in the magnitude of zero degrees. The angle $\phi 0$ is the calculated angle of the first measurement point or the calculated angle of the position defined by the temporally first recorded X coordinate and by the temporally first recorded Y coordinate.

The closed curved trajectory curve determined advantageously by the method according to the invention can be used advantageously in the way known from DE ?? (insofar as known, please add an appropriate patent specification!) for determining the alignment or position of a reference axis, which is brought into coincidence with the laser light beam 26, relative to the center axis 38 (symbolized only very schematically by a black point) of the circular cylindrical bore 36 of the body 39 (here in the form of a bearing seat)—compare FIG. 1A.

Advantageously, the method according to the method can also enable, through provision of the closed trajectory curve, the determination of the alignment or position of the reference axis—which, for example, can be the center axis of a further bore (not depicted here)—relative to the center axis 38 of the circular cylindrical bore 36 of the body 39 with high accuracy even in situations in which an inclinometer measurement is not possible or is not possible with sufficient accuracy. Conceivable here is a ship, for example, where an inclinometer measurement is not possible or possible with only very little accuracy.

What is claimed is:

1. A method for determining a closed trajectory curve (10) for measuring the symmetry of an inner surface (46) of a circular bore (36) of a body by a laser (12) and a laser light sensor (14) having a flat field of view (16), wherein the field of view (16) has a coordinate system (18) with an X coordinate axis (20) and a Y coordinate axis (22) at a right angle to the X coordinate axis (20), with the laser light sensor (14) being set up so as to record on the field of view (16) the X coordinate and Y coordinate of the position of the laser light spot (24) of a laser light beam (26) of the laser (12) impinging on the field of view (16), wherein the laser (12) is spatially fixed and the field of view (16) and laser light sensor (14) are configured to be movable and securely fixable, independent of gravity, in any position along the inner surface (46) of the cylindrical bore (36), wherein the method comprises the following steps:
  (A) Arrangement of the field of view (16) in the circular cylindrical bore (36) of the body (39) and conveying of the field of view (16) into a first position;
  (B) Irradiation of the field of view (16) with a laser light beam (26) generated by the laser (12) and recording of the X coordinate and Y coordinate of the position of the laser light spot (24) of the laser light beam (26) that the laser light spot (24) assumes on the field of view (16);
  (C) Conveying of the field of view (16) in temporal succession into at least two further positions, irradiation of the field of view (16) with the laser light beam (26) in each of the further positions and recording of the X coordinate and Y coordinate of the positions of the laser light spot (24) of the laser light beam (26) that the laser light spot (24) assumes on the field of view (16) in each of the further positions,
  wherein, in the first position and also in each of the further positions, the X coordinate axis (20) and the Y coordinate axis (22) are oriented at a right angle to the center axis (38) of the bore (36) and the origin (51) of the coordinate system (18) has a predetermined distance from the inner surface (46) of the bore (36) in the direction of the X coordinate axis (20) or the Y coordinate axis (22), wherein further positions differ in terms of the magnitude of the positional angle ($\phi_r$) at which the Y coordinate axis (22) or the X coordinate axis is inclined in a predetermined direction of rotation (44) with respect to the Y coordinate axis (22) or the X coordinate axis (20) of the field of view (16) in the first position, and wherein the field of view (16) in step (C) is conveyed in temporal succession into the at least two further positions in such a way that the positional angle of each of the further positions is greater than the positional angle of each temporally previously assumed position, with, in the temporally last assumed position, the magnitude of the positional angle being at least 90 degrees;
  (D) Assignment of zero degrees to the value of the positional angle of the X coordinate and Y coordinate recorded in the first position of the field of view (16);
  (E) Determination of the closed trajectory curve (10) by means of the X coordinate recorded in step (B) and (C) and/or the Y coordinate recorded in step (B) and (C), wherein, in step (E), furthermore, a plot of the trajectory curve (10) is determined on the basis of the recorded X coordinate and/or the recorded Y coordinate, said plot being parameterized by the positional angle of the field of view (16), which is measured starting from a positional angle value of zero degrees in the direction of the predetermined direction of rotation.

2. The method according to claim 1, wherein the predetermined distance from the inner surface (46) of the bore (36) in the direction of the X coordinate axis (20) or the Y coordinate axis (22) corresponds to the radius of the bore (36).

3. The method according to claim 1, wherein the closed trajectory curve (10) is an ellipse or a circle.

4. The method according to claim 1, wherein, in step (C), the field of view (16) is conveyed into at least fifteen further positions; in that, in the temporally last assumed position, the magnitude of the positional angle is 360 degrees; and in that, in step (E), a closed trajectory curve (10), which is parameterized by the positional angle of the field of view (16), is determined in the form of an ellipse or a circle, wherein exclusively only the recorded Y coordinates or exclusively only the recorded X coordinates are used for determination of the parameterized trajectory curve (10).

5. The method according to claim 1, wherein, in step (C), the field of view (16) is conveyed into at least two further positions; in that, in the temporally last assumed position, the magnitude of the positional angle is at least 90 degrees and less than 360 degrees or essentially 180 degrees, wherein, in step (E), a closed trajectory curve (10) is determined in the form of an ellipse or a circle by curve fitting to the recorded X coordinates and Y coordinates, and wherein the positional angle measured starting from an angle value of zero degrees in the direction of the predetermined direction of rotation is assigned to each point on the trajectory curve (10) for determination of the parameterized plot of the trajectory curve (10).

6. The method according to claim 1, wherein steps (D) and (E) are performed in an automated manner.

7. An apparatus (28) for determining a closed trajectory curve (10) for measuring the symmetry of an inner surface (46) of a circular bore (36) of a body, wherein the apparatus (28) has a laser (12), a laser light sensor (14) having a flat field of view (16), a holding device (17), and an analysis device (32),
  wherein the field of view (16) has a coordinate system (18) with an X coordinate axis (20) and a Y coordinate axis (22) that is at a right angle to the X coordinate axis (20), wherein the laser light sensor (14) is set up so as to record the X coordinate and Y coordinate of the positions of the laser light spot (24) on the field of view (16) of the laser light beam (26) that can be generated by the laser (12) and impinges on the field of view (16) wherein the laser (12) is spatially fixed and the field of view (16) and laser light sensor (14) are configured to be movable and securely fixable, independent of gravity, in any position along the inner surface (46) of the cylindrical bore (36),
  wherein the field of view is attached to the holding device (17) in a movable manner in such a way that the field of view (16) can be conveyed into a first position and into further positions on the holding device (17), in which the X coordinate axis (20) and the Y coordinate axis (22) are oriented at a right angle to the center axis (38) of a circular cylindrical bore (36) and in which the origin (51) of the coordinate system (18) has a predetermined distance from the inner surface (46) of the bore (36) in the direction of the X coordinate axis (20) or Y coordinate axis (22), wherein further positions differ in terms of the magnitude of the positional angle at which the Y coordinate axis (22) or the X coordinate axis is inclined in a predetermined direction of rotation

(44) with respect to the Y coordinate axis (22) or the X coordinate axis (20) of the field of view (16) in the first position, wherein the analysis unit (32) is set up so as to assign an angle value of zero degrees to the X coordinate and Y coordinate recorded in the first position of the field of view (16) and so as to determine the closed trajectory curve (10) from the X coordinates and/or Y coordinates recorded in the first position and in the further positions, and wherein the analysis unit (32) is further set up so as to determine a plot of the trajectory curve (10) on the basis of the recorded X coordinates and/or Y coordinates, said trajectory curve being parameterized by the positional angle of the field of view (16) that is measured starting from the angle value of zero degrees in the direction of the predetermined direction of rotation.

8. The apparatus (36) according to claim 7, wherein the closed trajectory curve (10) is an ellipse or a circle.

9. The apparatus (36) according to claim 7, wherein the closed trajectory curve (10) is an ellipse or a circle; and in that the analysis unit (32) is further set up so as to use exclusively only the recorded Y coordinates or exclusively only the recorded X coordinates for determination of the trajectory curve (10) parameterized by the positional angle, when the field of view (16) is conveyed into at least fifteen further positions and when, in the temporally last assumed position, the magnitude of the positional angle is 360 degrees.

10. The apparatus (36) according to claim 7, wherein the analysis unit (32) is set up so as to determine a closed trajectory curve in the form of an ellipse or a circle by curve fitting to the recorded X coordinates and Y coordinates and, for determination of the parameterized plot of the trajectory curve (10), assigns the positional angle measured starting from the angle value of zero degrees in the direction of the predetermined direction of rotation to each point on the trajectory curve (10) when the field of view (16) is conveyed into at least two further positions and, in the temporally last assumed position, the magnitude of the positional angle is at least 90 degrees and less than 360 degrees or essentially 180 degrees.

* * * * *